US 6,650,838 B2

(12) United States Patent
Tanaka et al.

(10) Patent No.: US 6,650,838 B2
(45) Date of Patent: Nov. 18, 2003

(54) DEVICE FOR OPENING COVER (75) Inventors: Yasuhiko Tanaka, Saitama (JP); Katsuaki Ohashi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/163,491

(22) Filed: Jun. 7, 2002

(65) Prior Publication Data

US 2002/0186978 A1 Dec. 12, 2002

(30) Foreign Application Priority Data

Jun. 8, 2001 (JP) ..................................... 2001-174418
Jun. 8, 2001 (JP) ..................................... 2001-174419

(51) Int. Cl.[7] .............................................. G03B 17/02
(52) U.S. Cl. ....................................... 396/539; 206/703
(58) Field of Search ................................. 396/539, 535; 206/703; 429/99, 100; 174/58, 66, 67

(56) References Cited

U.S. PATENT DOCUMENTS 3,979,228 A * 9/1976 Marchetti ..................... 429/99
5,601,939 A * 2/1997 Zander ........................ 396/539
6,395,980 B2 * 5/2002 Iitsuka ......................... 174/50

FOREIGN PATENT DOCUMENTS

JP 10-90770 A 4/1998
JP 11-54098 * 2/1999

* cited by examiner

Primary Examiner—D. Rutledge
(74) Attorney, Agent, or Firm—Birch, Stewart, Kolasch & Birch, LLP (57) ABSTRACT A cam groove is formed in a battery cover of a camera, while a slider is provided on a camera body side. A cam follower is formed on the slider. An entrance of the cam groove is smaller in width than the cam follower. As the slider is slid, the battery cover is pressed to be gradually displaced in the opening direction. When the cam follower passes the entrance, the battery cover is instantaneously forced out in the opening direction in a pop-up manner. Thus, the cover can be opened by one sliding operation. A rib is provided in the battery accommodation chamber in correspondence with the plus terminal of a battery. The rib is provided only in the optical axis direction to prevent the battery from falling out of the battery accommodation chamber when an impact is made on the camera in a direction parallel to the optical axis. The rib does not interfere with insertion or taking-out of the battery. The battery is thus prevented from falling out of the camera.

5 Claims, 11 Drawing Sheets

CLOSED STATE

WHEN OPENING OPERATION IS PERFORMED

DEVICE FOR OPENING COVER

BACKGROUND OF THE INVENTION

1. Field of the Invention

The present invention relates to a device for opening a cover and, more particularly, to a cover opening device suitable for opening a battery cover of a camera.

2. Description of the Related Art

Mechanisms ordinarily used as a mechanism for opening a battery cover of a camera are a screw type of mechanism in which a battery cover is rotated with a coin or the like, a disengagement type of mechanism using a member which is hooked and pulled by a fingernail or a coin to release a battery cover from an engaged state, and a type of mechanism using an expansible or elastic member which is integrally combined with or incorporated in a battery cover. Such conventional mechanisms for opening a battery cover are sometimes inconvenient to users in performing the operation for opening the battery cover.

A cover opening/closing device has also been proposed in which a slide knob with an engaging portion is provided on the camera body side, and in which a hook portion capable of engaging with an engaging portion of a slide knob is formed on a battery cover. This cover opening/closing device opens the cover by sliding the sliding knob and has the drawback of requiring a spring for urging the cover in the opening direction.

Japanese Patent Application Publication No. 10-90770 specification discloses a cover lock mechanism which undoes locking with an engaging member by elastically deforming the engaging member to open a cover. This mechanism has a drawback of requiring elastically deforming the engaging member by applying a force to this member.

A battery accommodation chamber of a camera is ordinarily closed with a battery cover to prevent a battery accommodated in the battery accommodation chamber from falling out of the chamber. However, if a large impact is made on the camera, for example, in the event of a fall of the camera, the battery cover may be accidentally opened to allow the battery to fall. In such a case, if the battery is lost, a new battery is set by a user and the date setting is thereby reset. A need then arises for the user to perform an unnecessarily burdensome operation for again making the date setting.

SUMMARY OF THE INVENTION

In view of the above-described circumstances, an object of the present invention is to provide a cover opening device which is capable of easily opening a cover of a camera by one sliding operation, and which prevents a battery from falling out of the camera even when the camera receives an impact.

To attain the above-described object, according to one aspect of the present invention, there is provided a device for opening a cover, having a cover opening slide knob slidably provided on the main body side, the slide knob having a cam follower, and a cam groove formed on the cover supported on the main body side so as to be able to open and close, the cam groove being capable of fittingly receiving the cam follower. The cam follower is fitted in the cam groove to engage the cover with the camera body. When the cover opening slide knob is slid, the cam follower is thereby moved in the cam groove to force out the cover in an opening direction by the action of the cam groove. According to the present invention, when the operation for sliding the cover opening slide knob is performed, the cover is forced out in the opening direction by the action of the cam groove to be opened.

Also, in the present invention, the above-described cover is a battery cover capable of opening and closing a battery accommodation chamber of a camera by turning on a hinge shaft. A battery having the shape of a cylinder or a rectangular block and having an electrode projecting from one of its end surfaces is accommodated in the battery accommodation chamber. A detachment-preventing rib is provided on the camera body at the side corresponding to the projecting electrode of the battery. The rib is formed in a place corresponding to the direction of opening of the battery cover to prevent the battery from springing out in the direction of opening of the battery cover.

Thereby, according to the present invention, the detachment-preventing rib is provided at the side of the battery accommodation chamber corresponding to the plus terminal of the battery, and the rib is formed in a place corresponding to the direction of opening of the battery cover, thereby preventing the battery from springing out of the battery accommodation chamber even when, for example, an impact caused by a fall of the camera is made on the camera.

Since no rib portion is formed in a place corresponding to the direction of insertion of the battery, there is no interference with loading and unloading of the battery.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a cover opening device in accordance with the present invention will be described below in detail with reference to the accompanying drawings.

Figure 1:
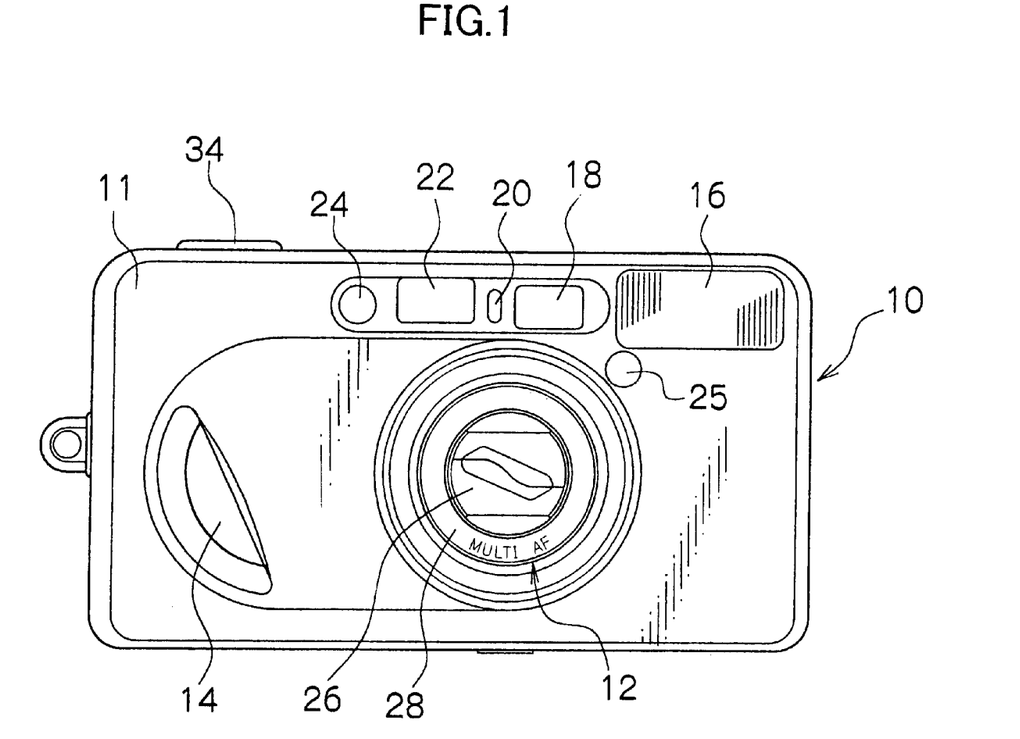
FIG. 1 is a front view of a camera relating to an embodiment of the present invention.
Figure 2:
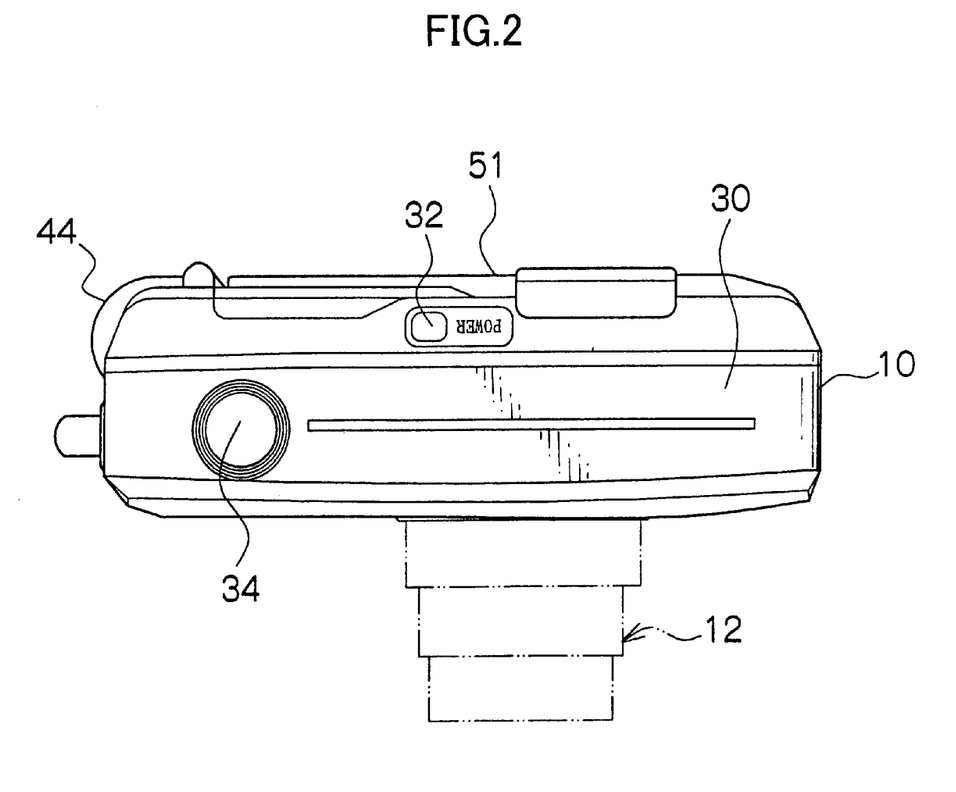
FIG. 2 is a plan view of the camera relating to the embodiment of the present invention.
Figure 3:
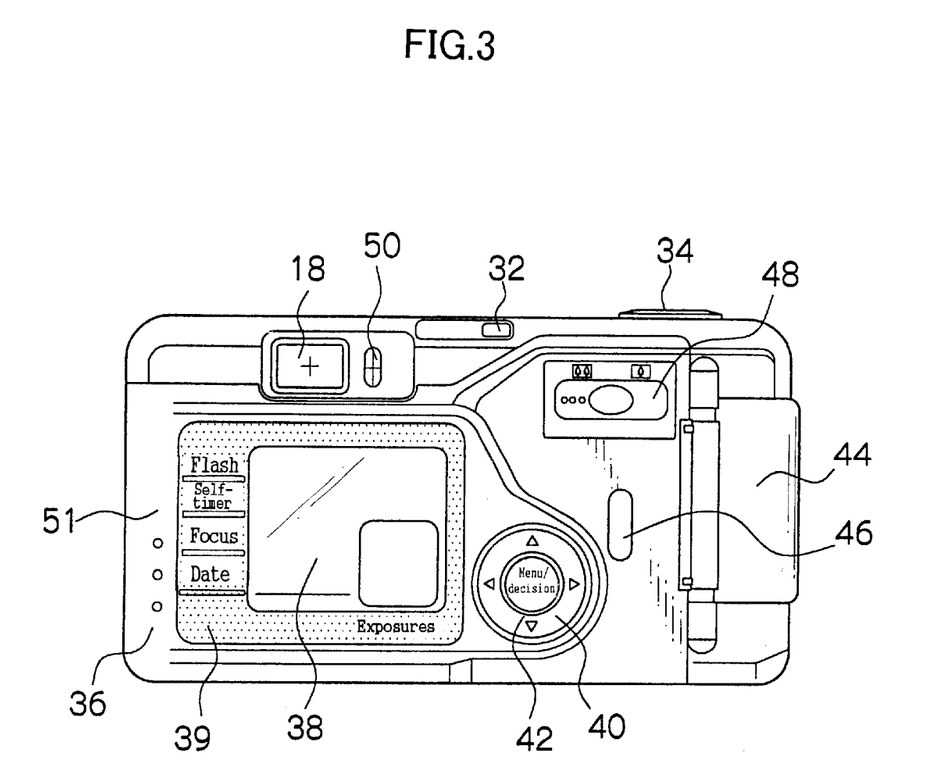
FIG. 3 is a rear view of the camera relating to the embodiment of the present invention.
Figure 4:
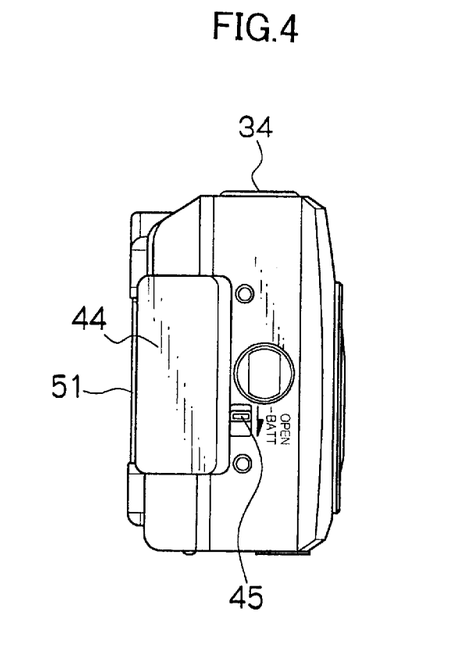
FIG. 4 is a left side view of the camera relating to the embodiment of the present invention.
Figure 5:
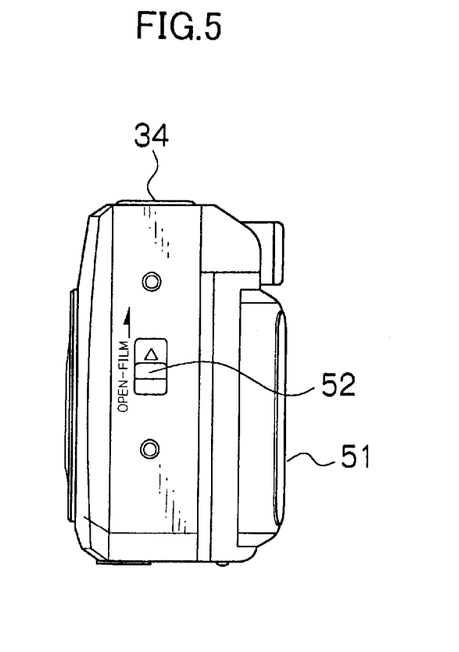
FIG. 5 is a right side view of the camera relating to the embodiment of the present invention.

FIGS. 1 to 5 show an external appearance of a camera to which the present invention is applied, and in which a 135 film is loaded. FIG. 1 is a front view, FIG. 2 is a plan view, FIG. 3 is a rear view, FIG. 4 is a left side view, and FIG. 5 is a right side view.

Referring to FIG. 1, at a front side 11 of a case 10 of a camera are provided a zoom lens barrel 12, a raised finger-hold portion (grip portion) 14 having a generally crescent shape, a strobe window 16, a finder 18, a self timer indication window 20, a passive-type automatic focusing (AF) window 22, a remote control light receiving window 24, a photometry window 25, etc. A lens barrier 26 is provided on the front end of the zoom lens barrel 12, and an annular ornamental plate 28 is provided outside the lens barrier 26.

A main switch 32 is provided in a rear corner portion of an upper surface 30 of the camera case 10 shown in FIG. 2, and a shutter button 34 is provided in a flat portion of the upper surface 30 at a left position as viewed in FIG. 2. Referring to FIG. 3, a liquid crystal display window 38, a crisscross key type of selection button 40, and a menu determination button 42 are provided at a back side 36 of the camera case 10 shown in FIG. 3. Characters are printed at a left side 39 of the LCD window 38 to represent, for example, "Flash", "Self-timer", "Focus", and "Date". For example, a function such as flash photography is selected with the menu selection button 40, and the menu determination button 42 is then operated to execute the selection of the function. A battery cover 44 is provided in a left back portion of the case 10, and a battery chamber is formed inside the battery cover 44. The battery cover 44 can be turned on a hinge shaft 47 (shown in FIGS. 6 to 8) to open or close. As shown in FIG. 4, a battery cover opening knob 45 is provided in a side surface of the case 10 and is slidable in the vertical direction. The battery cover 44 can be opened by pressing and moving the battery cover opening knob 45 downward.

A film accommodation chamber (not shown) is formed at the left side of the battery cover (battery chamber) 44, and a transparent film cartridge check window 46 is formed at a corresponding position to enable the film speed, etc., to be checked from the outside. A seesaw-type zoom button 48, an AF indicator window 50, etc., are formed in a back top portion of the camera case 10. The AF indicator window 50 is lighted in green when distance metering performing by maintaining the shutter button 34 in a half pressed state is completed. The AF indicator window 50 is lighted so as to blink in a case where distance metering cannot be performed, for example, when the distance to a subject is excessively small. A back cover opening knob 52 is provided in a right side surface of the case 10, as shown in FIG. 5. The back cover opening knob 52 is slidable in the vertical direction. The back cover opening knob 52 is slid upward to enable a back lid 51 to be opened when a film is loaded or taken out.

Figure 6:
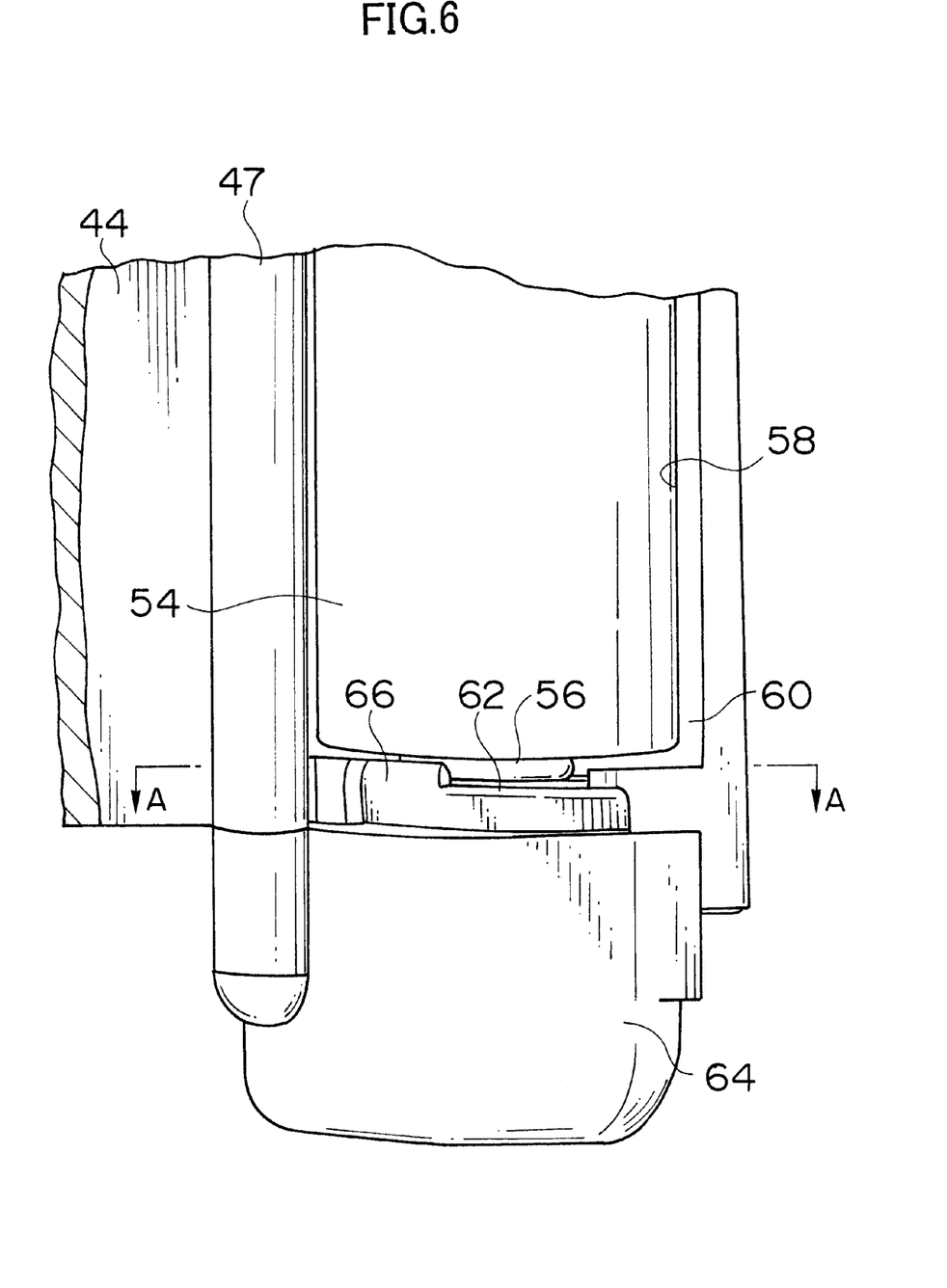
FIG. 6 is an enlarged perspective view of a structure in the vicinity of a battery accommodation chamber.
Figure 7:
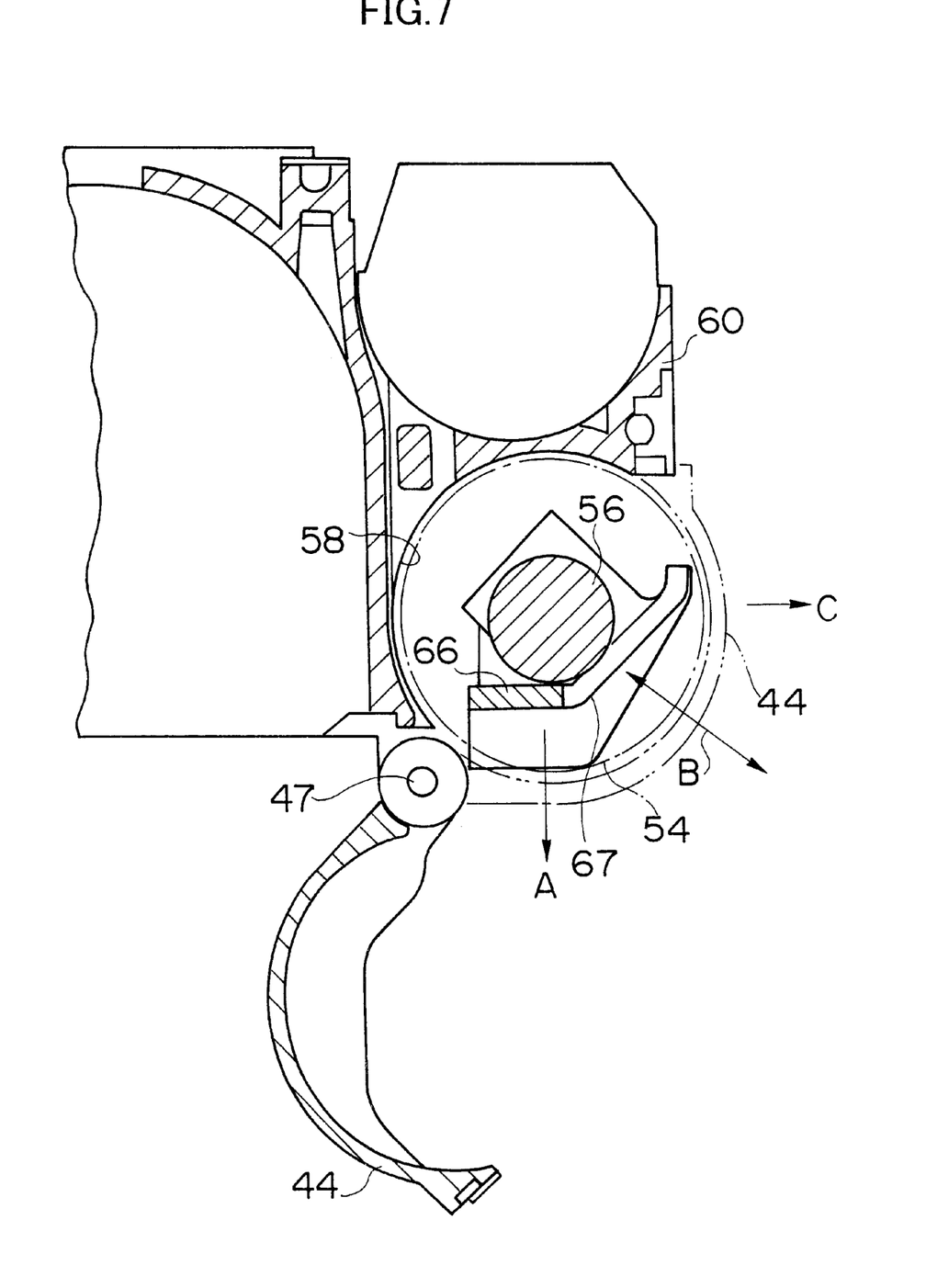
FIG. 7 is a cross-sectional view taken along a line A—A in FIG. 6.
Figure 8:
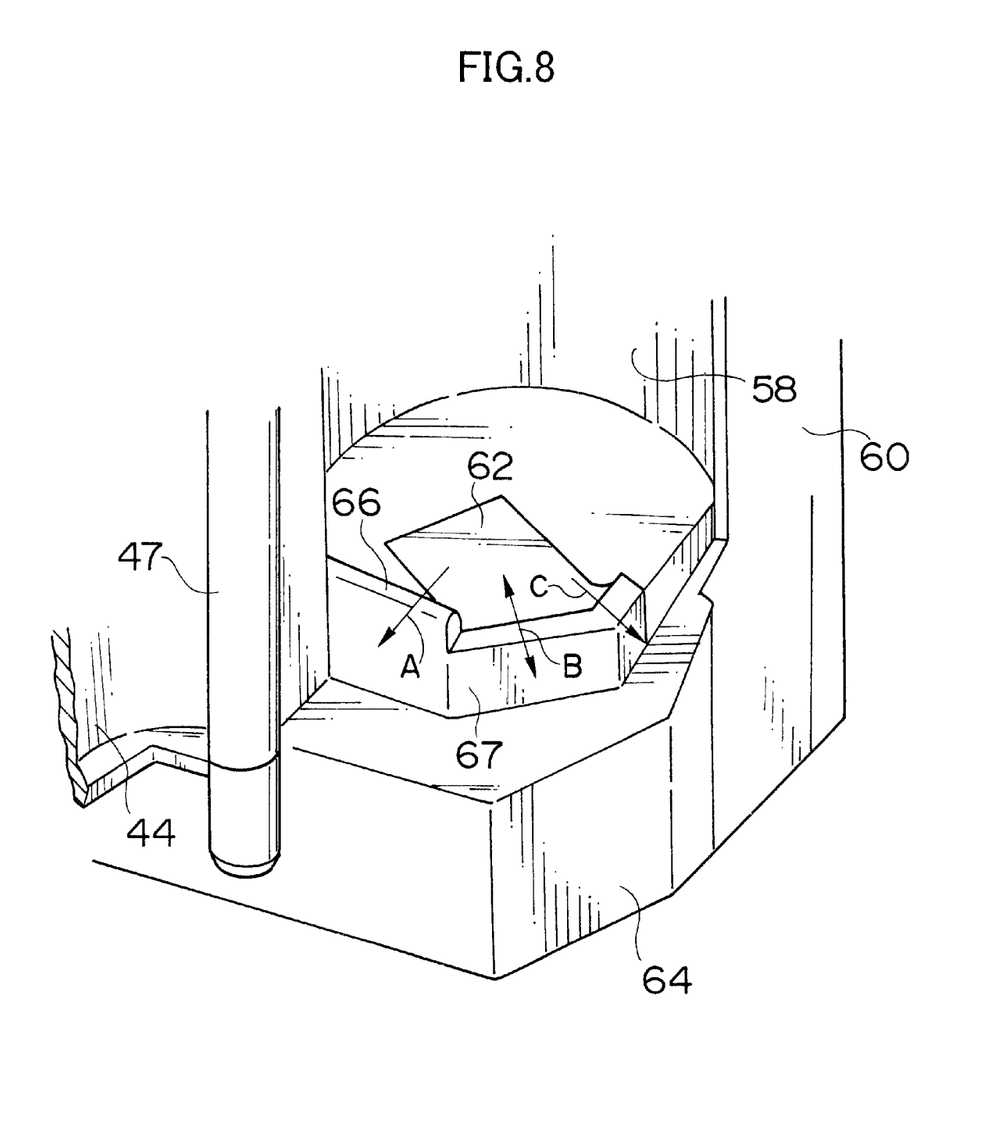
FIG. 8 is a diagram showing details of a detachment-preventing rib.

FIG. 6 is an enlarged perspective view of a structure in the vicinity of the battery accommodation chamber when the battery cover 44 is opened. FIG. 7 is a cross-sectional view taken along the line A—A of FIG. 6, and FIG. 8 is a perspective view of the vicinity of a detachment-preventing rib. As shown in FIG. 6, a battery 54 is constructed as a cylindrical lithium battery and placed in a battery accommodation chamber 58 with its plus terminal 56 down. The plus terminal 56 of the battery 54 is electrically connected to a contact piece 62 formed on a camera body 60, while a minus terminal of the battery 54 is electrically connect to a contact piece (not shown) provided in an upper portion of the camera body 60.

An external-appearance cover member 64 is provided on the camera body 60. A detachment-preventing rib 66 is formed on the external-appearance cover member 64, as shown in FIGS. 6 to 8. The rib 66 has a height such as to interfere with the pulse terminal 56 of the battery 54 (a height such as to stop the battery 54 from moving), as shown in FIG. 6. That is, the height of the rib 66 is slightly smaller than the length of the pulse terminal 56 projecting from the battery 54. The rib 66 is formed so as to be located only on the side of the battery terminal as indicated by the direction of arrow A from the camera indicated in FIG. 7 (corresponding to the direction of opening of the battery cover 44). No rib portion 66 is formed in correspondence with the direction of insertion of the battery 54 indicated by arrow B in FIG. 7. The rib 66 is formed by raising a portion of the external-appearance cover member 64, as shown in detail in FIG. 8.

That is, as shown in FIG. 8, a wall 67 rises from the external-appearance cover member 64 and its portion corresponding to the direction of an arrow A (the direction of opening of battery cover 44) is formed slightly higher than the contact piece 62 to form the rib 66, while its portion corresponding to the direction of arrow B and the direction of arrow C is formed flush (coplanar) with the contact piece 62.

The rib 66 formed as described above will function as described below.

The battery cover opening knob 45 is pressed and moved downward to open the battery cover 44, and the battery 54 is inserted into the battery accommodation chamber 58 in the insertion direction B. At this time, the rib 66 does not impede the inserting operation since it is formed only in the place corresponding to the direction of arrow A (the direction of opening of battery cover 44) and no rib portion is formed in the place corresponding to the insertion direction. For the same reason, the rib 66 does not impede an operation for taking out the battery by moving the battery in the opposite direction.

On the other hand, in a case where the camera falls accidentally to receive an impact force applied in a direction along the optical axis, the battery cover 44 may be opened by an impact thereby caused. Even in such as case, the battery 54 can be prevented from moving out and falling, since the rib 66 is provided in the place corresponding to the direction of opening of the battery 44 (along the optical axis) indicated by arrow A. In a case where an impact force is applied in the direction of an arrow C as a result of a fall of the camera in a certain attitude, the possibility of opening of the battery cover 44 is low and the battery 54 does not move out of the battery chamber 58 to fall, because the battery cover structure is such that the battery cover 44 is not easily disengaged in the direction of arrow C.

Figure 9:
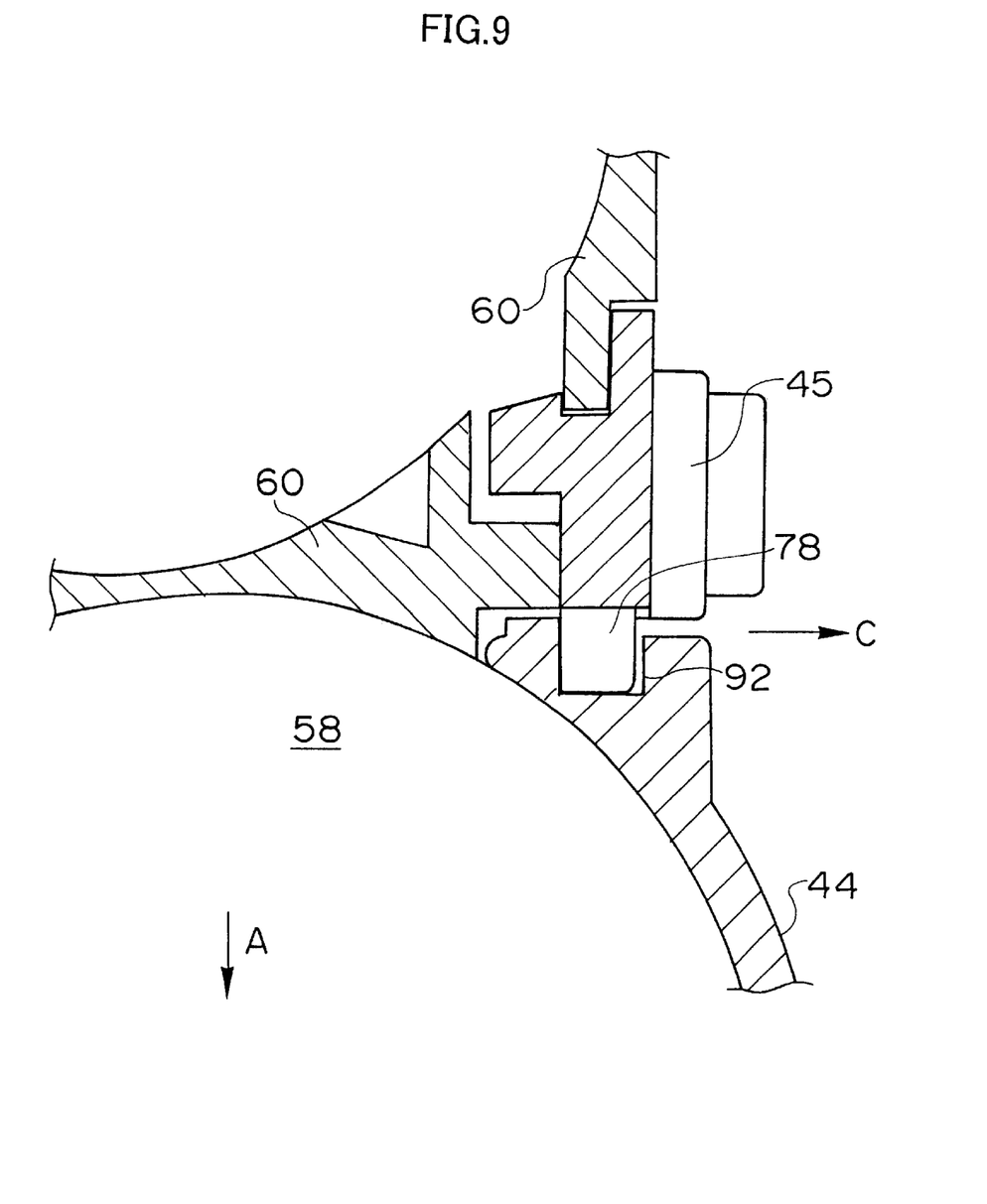
FIG. 9 is an enlarged diagram of a battery cover engaging portion.

The above-described structure and function will be described in more detail. FIG. 9 is an enlarged diagram of an engaging portion of the battery cover 44. An engaging portion (cam follower) 78 of the battery cover opening knob 45 is fitted in an engagement groove (cam groove) 92 formed in the battery cover 44. The battery cover 44 is of such a structure that it does not easily come off in the direction of an arrow C, that is, it prevents the battery 54 from moving out of the accommodation chamber 58 to fall. On the other hand, in the direction of arrow A in which the battery cover 44 can move comparatively easily, the rib 66 functions as described above to prevent the battery 54 from springing out of the accommodation chamber 58.

While the rib 66 in the above-described example of the structure is provided on the external-appearance cover member 64, it may alternatively be formed directly on the camera body 60.

In this embodiment, the rib 66 is provided at the bottom of the battery accommodation chamber 58. Alternatively, if the plus terminal is placed at the top of the battery accommodation chamber 58, a similar rib may be provided at the top of the battery accommodation chamber 58.

While the lithium battery 54 in this embodiment has been described as a cylindrical lithium battery, it may have the shape of a rectangular block or may be an AA alkaline battery or the like.

The position of the hinge shaft 47 is not limited to that at the arrow A side. Alternatively, it may be set at the arrow C side. In such a case, the rib 66 is formed in a position corresponding to the arrow C, i.e., in the direction of opening of the battery cover 44.

Figure 10:
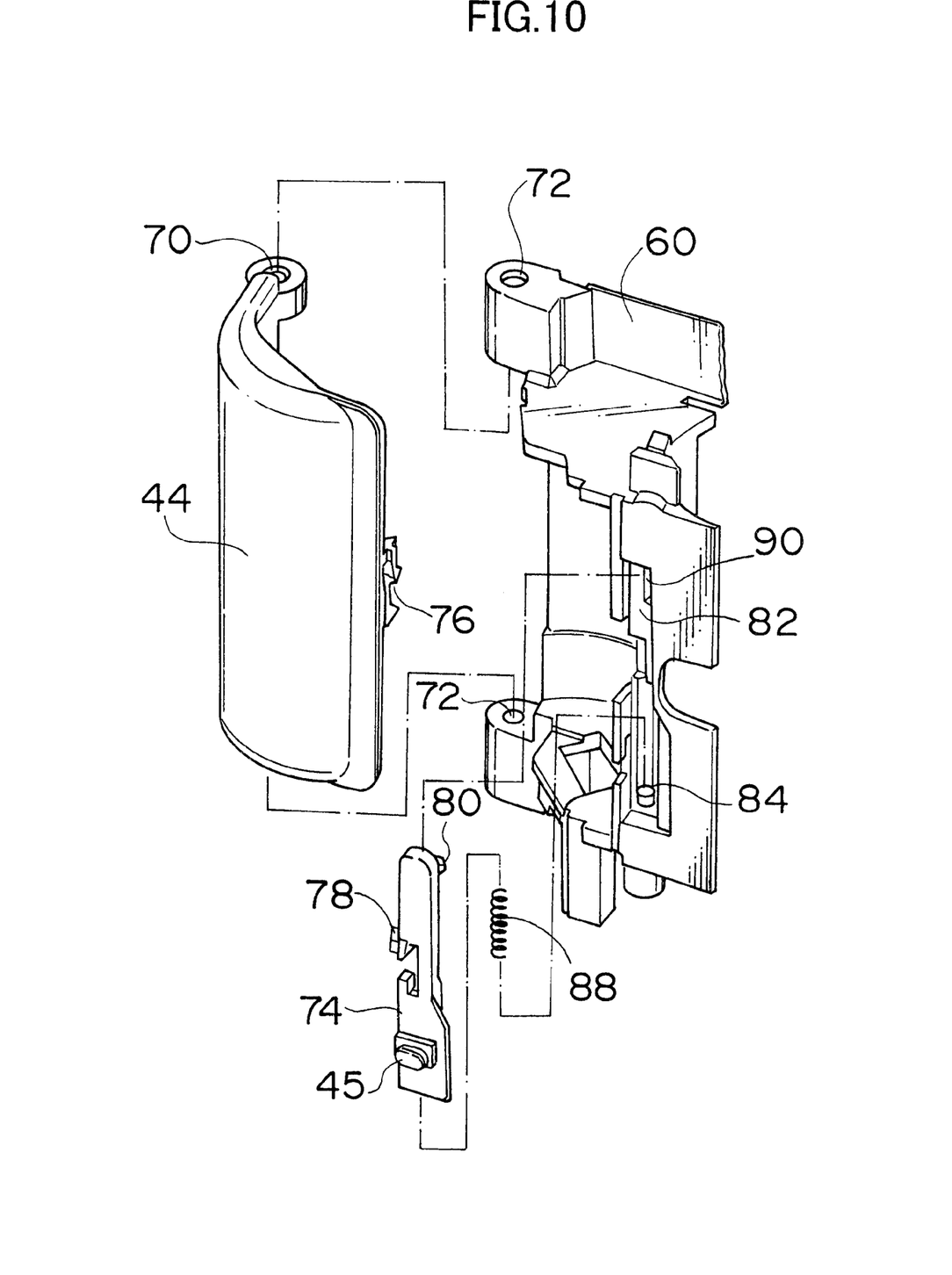
FIG. 10 is an exploded perspective view of a device for opening a battery cover.
Figure 11A:
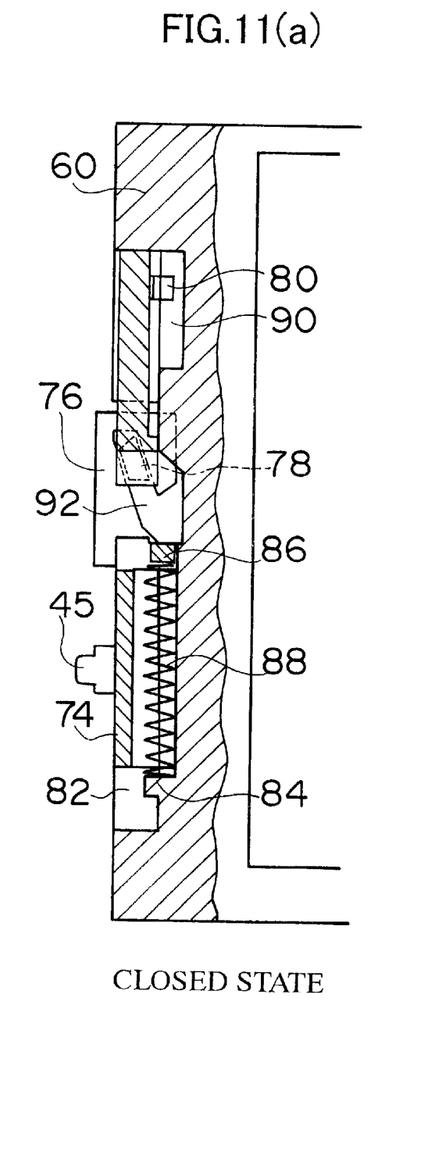
FIGS. 11(a) and 11(b) are cross-sectional views of the device for opening the battery cover, seen from a front side of the camera.
Figure 11B:
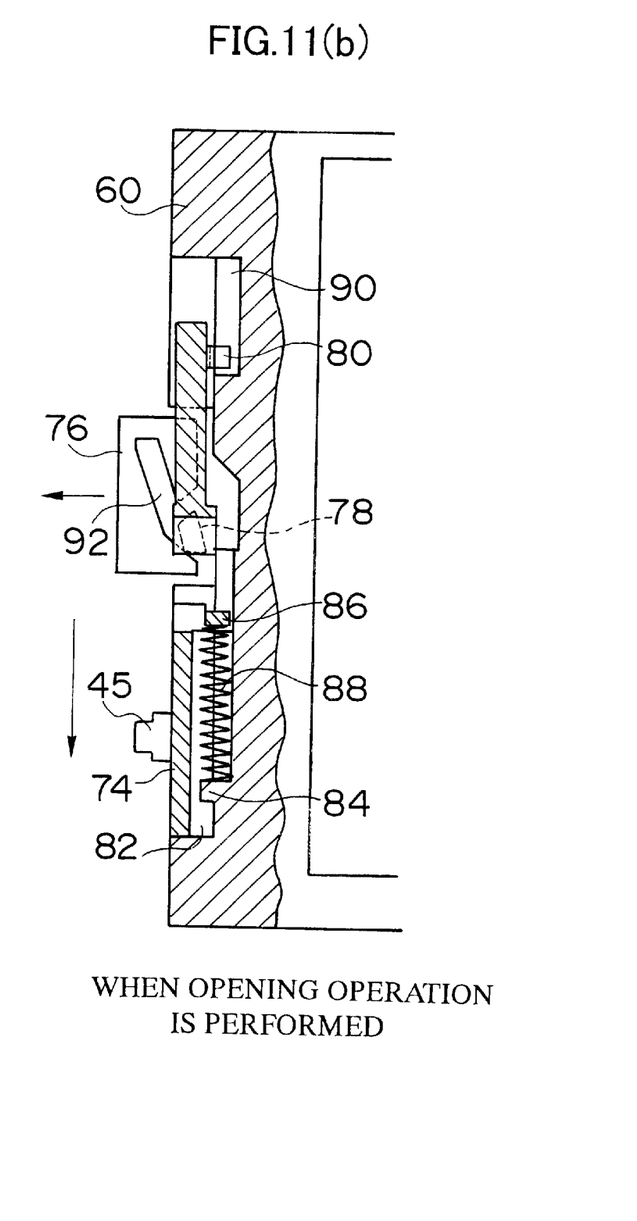

FIGS. 10 to 12 show a device for opening the battery cover 44, which represents an application of the present invention. As shown in FIG. 10, upper and lower hinge portions 70 (only the upper one of which is shown) are provided on the battery cover 44, and hinge portions 72 are provided on the camera body 60 side in correspondence with the hinge portions 70. The hinge shaft 47 (shown in FIGS. 6 to 8) is passed through the hinge portions 70 and 72 to enable the battery cover 44 to turn on the camera body 60.

A slider 74 slidable on the camera body 60 in the vertical direction and a cam groove member 76 formed in the battery cover 44 constitute the device for opening the battery cover 44. The slider 74 will first be described. The battery cover opening knob 45 is protrusively formed on the slider 74. The cam follower 78 and coming-off-stop projections 80 (only the upper one of which is shown) are also formed on the slider 74. The slider 74 is inserted in a slide channel 82 formed in the camera body 60 so as to be freely slidable in the vertical direction. As shown in FIGS. 10 and 11, a coil spring 88 is placed between a spring seat 84 formed at the bottom of the slide channel 82 and a spring seat 86 formed on the slider 74. The slider 74 is urged upward by the coil spring 88, as shown in FIG. 11(a). The projection 80 formed on an upper portion of the slider 74 is fitted in a restraint channel 90 formed continuously with the slide channel 82, thereby preventing the slider 74 from coming off the slide channel 82. The same coming-off-stop projection 80 is also formed on a lower portion of the slider 74.

The cam groove 92 is formed in the cam groove member 76, as shown in detail in FIGS. 12(a) to 12(d). In the cam groove 92 are formed a taper surface 94 which engages with the cam follower 78 when the battery cover 44 is closed, a taper surface 96 which forces out the battery cover 44 in an opening direction, an entrance 98, and a second taper surface 97 for forcing out the cam follower 78 in an opening direction after the cam follower 78 has passed the entrance 98. On the other hand, a taper surface 100, and an upper edge 102 and a lower edge 104 are formed on the cam follower 78, as shown in FIGS. 12(a) to 12(d).

The operation of the embodiment of the present invention constructed as described above will be described. First, when the battery cover 44 is in the closed state (initial position), the slider 74 is maintained in a position corresponding to the upper end of the slide channel 82 by the urging force of the spring 88, and the taper surface 100 of the cam follower 78 is in contact with the taper surface 94 of the cam groove 92. The cam follower 78 thus engages with the cam channel member 76. In this state, the battery cover 44 is closed.

Figure 12A:
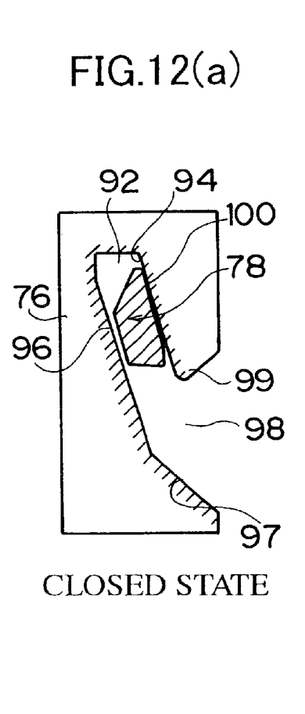
FIGS. 12(a) to 12(d) are diagrams showing an opening process performed by the battery cover opening device.
Figure 12B:
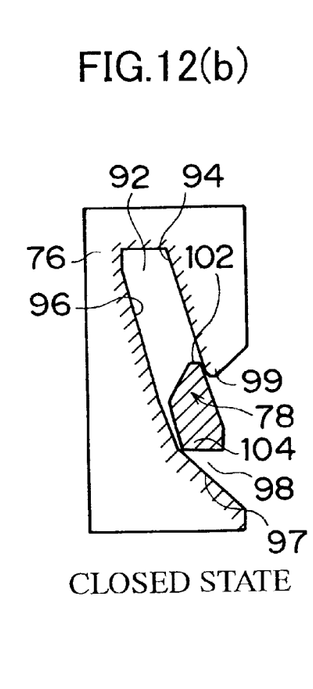

Next, when the battery cover opening knob 45 is pressed and moved downward in order to open the battery cover 44, the slider 74 is moved downward against the urging force of the spring 88. As the slider 74 is moved downward, the cam follower 78 is brought into contact with the first taper surface 96 of the cam groove 92 as shown in FIG. 12(a). When the cam follower 78 is further moved downward, the cam groove member 76 is pressed by the operation of the taper surface 96 in the leftward direction, that is, the battery cover 44 is pushed in the opening direction, as shown in FIGS. 11(b) and 12(b).

Figure 12C:
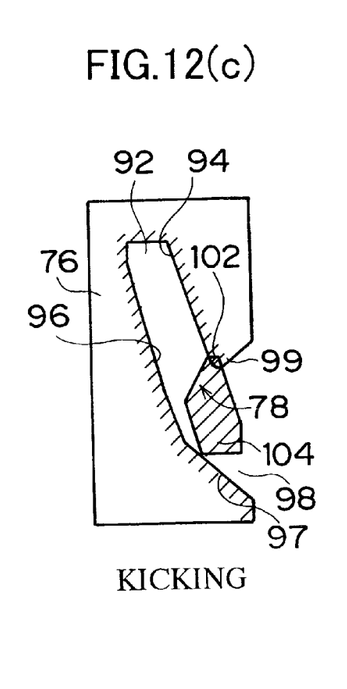
Figure 12D:
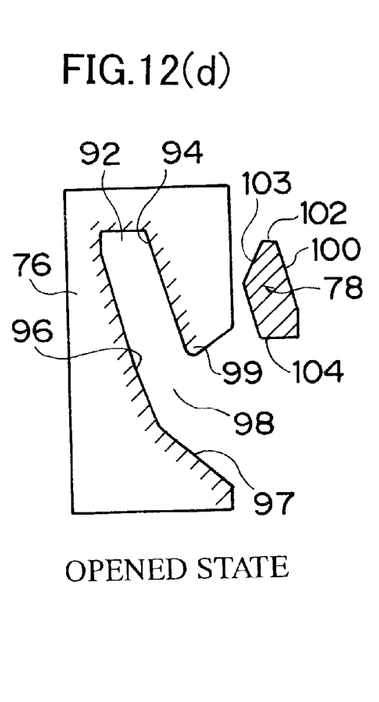

When the battery cover opening knob 45 is further pressed and moved downward, the cam follower 78 reaches a position at the entrance 98 of the cam groove 92, as shown in FIG. 12(c). As shown in FIG. 12(b), the entrance 98 of the cam groove 92 is formed slightly smaller than the length of a line connecting an upper edge 102 and a lower edge 104 of the cam follower 78. Therefore, the cam follower 78 is stopped from passing the entrance 98. However, when the battery cover opening knob 45 is further pressed downward, an edge portion 99 of the cam groove member 76 and the cam follower 78 are elastically deformed so that the cam follower 78 can pass the entrance 98. Just when the cam follower 78 passes the entrance 98, the lower edge 104 of the cam follower 78 kicks (presses outward) the cam groove member 76 in the cover opening direction, and the cam follower 78 is further forced out in the opening direction by the second taper surface 97, thereby opening the battery cover 44. After the battery cover 44 has started opening, the cam follower 78 moves around the edge portion 99 to such a position as to maintain the battery cover 44 in the open state as shown in FIG. 12(d).

In the above-described opening operation, since the entrance 98 is formed smaller than the cam follower 78, and since the taper surface 103 of the cam follower 78 moves around the edge portion 99, failure to complete the operation, i.e., returning of the cam follower 78 to the cam groove 92, when the user's hand is let go off the knob after the cam follower 78 has passed the entrance 98 can be prevented with reliability.

According to the present invention, as described above, the battery cover 44 can be opened by one sliding operation. When the use's fingers are let go off the battery cover opening knob 45 after the opening operation, the battery cover opening knob 45 is returned to the initial position by the force of the spring 88. To close the battery cover, the battery cover is pushed by a user's fingers. The slider 74 is thereby bent to enable the cam follower 78 to be fitted in the cam groove 92 and to be maintained in the state of engaging with the same.

While an example of application of the present invention to a battery cover 44 has been described as an embodiment of the present invention, the present invention can also be applied to a back lid 51 of a camera. The present invention can also be applied to any electronic device such as a portable telephone other than cameras.

As described above, the cover opening device of the present invention is capable of pop-up opening of the cover by sliding the cover opening slide knob one time without any additional member for pop-up opening of the cover. The cover opening device can be provided in a restricted space, for example, between cylindrical portions such as a battery chamber and a capacitor chamber in cameras, etc.

Also, according to the present invention, a detachment-preventing rib is provided at the side corresponding to the electrode of a battery, and the rib is formed in a place corresponding to the direction of opening of the battery cover, thereby preventing the battery from moving out of the battery accommodation chamber to fall even when, for example, an impact caused by a fall of the camera is made on the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A device for opening a cover, comprising:

a cover opening slide knob slidably provided on a main body side, the slide knob having a cam follower; and a cam groove formed on the cover supported on the main body side so as to be able to open and close, the cam groove being capable of fittingly receiving the cam follower, wherein:

the cam follower is fitted in the cam groove to engage the cover with the main body side; and when the cover opening slide knob is slid, the cam follower moves the cam groove to force out the cover in an opening direction by an action of the cam groove.

2. The device according to claim 1, wherein:

the cover is a battery cover capable of opening and closing a battery accommodation chamber of a camera by turning on a hinge shaft;

a battery having a shape of one of a cylinder and a rectangular block and having an electrode projecting from one of its end surfaces is accommodated in the battery accommodation chamber; and a detachment-preventing rib is provided on the camera body at a side corresponding to the projecting electrode of the battery, the rib being formed in a place corresponding to the opening direction of the battery cover to prevent the battery from springing out in the opening direction of the battery cover.

3. The device according to claim 1, wherein:

the cam groove has a first taper surface and a second taper surface;

an entrance of the cam groove is formed slightly smaller than the cam follower;

the first taper surface acts on the cam follower so as to force out the cover in the opening direction; and the second taper surface acts on the cam follower so that the cam follower comes off the cam groove when passing the entrance of the cam groove.

4. The device according to claim 3, wherein:

the cover is a battery cover capable of opening and closing a battery accommodation chamber of a camera by turning on a hinge shaft;

a battery having a shape of one of a cylinder and a rectangular block and having an electrode projecting from one of its end surfaces is accommodated in the battery accommodation chamber; and a detachment-preventing rib is provided on the camera body at a side corresponding to the projecting electrode of the battery, the rib being formed in a place corresponding to the opening direction of the battery cover to prevent the battery from springing out in the opening direction of the battery cover.

5. A battery accommodation chamber of a camera having a battery cover capable of opening and closing the battery accommodation chamber by turning on a hinge shaft, a battery having a shape of one of a cylinder and a rectangular block and having an electrode projecting from one of its end surfaces being accommodated in the battery accommodation chamber, wherein there is provided a detachment-preventing rib on a camera body on a side corresponding to the projecting electrode of the battery, the rib being formed in a place corresponding to the opening direction of the battery cover to prevent the battery from springing out in the opening direction of the battery cover.

* * * * *